United States Patent
Cantrell et al.

(10) Patent No.: US 7,451,489 B2
(45) Date of Patent: Nov. 11, 2008

(54) ACTIVE NETWORK DEFENSE SYSTEM AND METHOD

(75) Inventors: Craig Cantrell, Austin, TX (US); Marc Willebeek-Lemair, Austin, TX (US); Dennis Cox, Austin, TX (US); John McHale, Austin, TX (US); Brian Smith, Fort Worth, TX (US); Donovan Kolbly, Austin, TX (US)

(73) Assignee: TippingPoint Technologies, Inc., Austin, TX (US)

( * ) Notice: Subject to any disclaimer, the term of this patent is extended or adjusted under 35 U.S.C. 154(b) by 479 days.

(21) Appl. No.: 10/930,392

(22) Filed: Aug. 31, 2004

(65) Prior Publication Data

US 2005/0044422 A1  Feb. 24, 2005

Related U.S. Application Data

(62) Division of application No. 10/291,095, filed on Nov. 7, 2002.

(51) Int. Cl.
*H04L 9/00* (2006.01)
*G06F 11/30* (2006.01)
*G06F 15/173* (2006.01)

(52) U.S. Cl. .............................. 726/25; 726/4; 726/13; 726/26; 709/224; 709/225

(58) Field of Classification Search .................... 726/25
See application file for complete search history.

(56) References Cited

U.S. PATENT DOCUMENTS

| | | | |
|---|---|---|---|
| 5,813,001 A | 9/1998 | Bennett | |
| 5,835,726 A | 11/1998 | Shwed et al. | |
| 5,878,231 A | 3/1999 | Baehr et al. | |
| 6,134,591 A | 10/2000 | Nickles | |
| 6,219,706 B1 | 4/2001 | Fan et al. | |
| 6,269,447 B1 | 7/2001 | Maloney et al. | |
| 6,279,113 B1 | 8/2001 | Vaidya | |
| 6,453,345 B2 | 9/2002 | Trcka et al. | |

(Continued)

OTHER PUBLICATIONS

Shafique, F., et al, 'Correlating Multi-Session Attacks via Replay', Nov. 2006, Univ. of Toronto, entire document, http://www.usenix.org/event/hotdep06/tech/prelim_papers/shafique/shafique.pdf.*

(Continued)

*Primary Examiner*—Kristine Kincaid
*Assistant Examiner*—Ronald Baum
(74) *Attorney, Agent, or Firm*—Gardere Wynne Sewell LLP (57) ABSTRACT

An active network defense system is provided that is operable to monitor and block traffic in an automated fashion. This active network defense system is placed in-line with respect to the packet traffic data flow as a part of the network infrastructure. In this configuration, inspection and manipulation of every passing packet is possible. An algorithmic filtering operation applies statistical threshold filtering to the data flow in order to identify threats existing across multiple sessions. A trigger filtering operation applies header and content match filtering to the data flow in order to identify threats existing within individual sessions. Threatening packet traffic is blocked and threatening sessions are terminated. Suspicious traffic is extracted from the data flow for further examination with more comprehensive content matching as well as asset risk analysis. A flow control mechanism is provided to control passage rate for packets passing through the data flow.

59 Claims, 2 Drawing Sheets

U.S. PATENT DOCUMENTS

| | | | |
|---|---|---|---|
| 6,477,651 B1 | 11/2002 | Teal | |
| 6,499,107 B1 | 12/2002 | Gleichauf et al. | |
| 6,513,122 B1 | 1/2003 | Magdych et al. | |
| 6,519,703 B1 | 2/2003 | Joyce | |
| 6,550,012 B1 | 4/2003 | Villa et al. | |
| 6,553,377 B1 | 4/2003 | Eschelbeck et al. | |
| 6,611,875 B1 | 8/2003 | Chopra et al. | |
| 6,651,099 B1 | 11/2003 | Dietz et al. | |
| 6,654,882 B1 | 11/2003 | Froutan et al. | |
| 6,711,615 B2 | 3/2004 | Porras et al. | |
| 6,725,378 B1 | 4/2004 | Schuba et al. | |
| 6,735,702 B1 | 5/2004 | Yavatkar et al. | |
| 6,738,814 B1 | 5/2004 | Cox et al. | |
| 6,816,455 B2 * | 11/2004 | Goldberg et al. | 370/230 |
| 6,901,517 B1 | 5/2005 | Redmore | |
| 6,963,912 B1 * | 11/2005 | Schweitzer et al. | 709/224 |
| 7,031,316 B2 | 4/2006 | Maher, III et al. | |
| 7,099,940 B2 * | 8/2006 | Givoly | 709/224 |
| 2001/0052014 A1 | 12/2001 | Sheymov et al. | |
| 2002/0023227 A1 | 2/2002 | Sheymov et al. | |
| 2002/0116639 A1 | 8/2002 | Chefalas et al. | |
| 2003/0135749 A1 | 7/2003 | Gales et al. | |
| 2003/0149888 A1 | 8/2003 | Yadav | |
| 2003/0154399 A1 | 8/2003 | Zuk et al. | |
| 2003/0159060 A1 | 8/2003 | Gales et al. | |

OTHER PUBLICATIONS

Zeltser, et al., "Inside Network Perimeter Security: Stateful Firewalls," Que Publishing, on-line article at quepublishing.com, Apr. 29, 2005.

"What is firewall security," SecureWorks™, Technical Resource Center, Firewall-Security, on-line newsletter at www.secureworks.com, Jul. 19, 2005.

"Addressing the Limitations of Deep Packet Inspection with Complete Content Protection," Fortinet, Inc., White Paper, dated Jan. 2004, www.fortinet.com.

Ido Dubrawski, "Firewall Evolution—Deep Packet Inspection," on-line article at www.securityfocus.com, Julu 29, 2003.

Thomas Porter, "The Perils of Deep Packet Inspection," on-line article at www.securityfocus.com, Jan. 11, 2005.

* cited by examiner

ACTIVE NETWORK DEFENSE SYSTEM AND METHOD

CROSS-REFERENCE

The present application is a Divisional of pending U.S. patent application Ser. No. 10/291,095, filed Nov. 7, 2002, the disclosure of which is hereby incorporated by reference.

The present application is related to U.S. application for patent Ser. No. 10/136,889, filed Apr. 30, 2002, entitled NETWORK SECURITY SYSTEM INTEGRATION, the disclosure of which is hereby incorporated by reference.

The present application is related to U.S. application for patent Ser. No. 10/217,862, filed Aug. 12, 2002, entitled MULTI-LEVEL PACKET SCREENING WITH DYNAMICALLY SELECTED FILTERING CRITERIA, the disclosure of which is hereby incorporated by reference.

BACKGROUND OF THE INVENTION

1. Technical Field of the Invention

The present invention relates to the detection and suppression of network intrusions.

2. Description of Related Art

As enterprises increasingly use the Internet to conduct business, the amount of confidential and sensitive information that is delivered over, and is accessible through, the Internet is also increasing. Unlike the private, dedicated communications networks that enterprises have used for business for the last several decades, which were relatively secure from outside intruders, the Internet and networks connected to an enterprise are susceptible to security threats and malicious eavesdropping due to their openness and ease of access. Recently, there has been an increase in the frequency of attempted breaches of network security, or hacker attacks, intended to access this confidential information or to otherwise interfere with network communications.

Network attacks are becoming not only more prevalent but also more sophisticated and severe, resulting in part from the availability of tools and information on how to conduct these attacks, an increase in hacker sophistication, an increase in the number of network access points that are vulnerable to attack and an increase in the overall amount of confidential information accessible through or delivered over the Internet. These attacks include distributed denial of service attacks, in which an attacker floods a Web site with large numbers of packets or connection requests that overwhelm the Web site and prevent legitimate users from accessing it. Other types of attacks are designed not just to prevent access to a Web site, but also to penetrate its security and allow a hacker to take control of a server and deface the Web site or steal sensitive information. Still other attacks include malicious eavesdropping, which allows a hacker to misappropriate confidential communication transmitted over the Internet. If confidential communications get into the wrong hands, damage to the business of the enterprise or, at the very least, damage its reputation may arise. There is also a significant cost and negative publicity resulting from denial of service attacks. In an attempt to combat all of these types of attacks, enterprises have been increasing their security budgets to address heightened network vulnerability concerns.

Intrusion detection systems are commonly used as one measure of network defense. Such systems are commonly passive systems which operate to monitor traffic, identify portions of the traffic which are suspicious, and then issue alerts or alarms when such traffic is detected. No matter how intelligent or accurate such intrusion detection systems are, they are not typically equipped to take any active efforts in response to a suspected attack. Alerts can be generated about each instance of suspicious activity, but this may be of little comfort to the network security administrator. The reason for this is that in many instances by the time the alert is generated and recognized, it is too late to provide any meaningful response. The damage has already been done. Simply put, knowing about a security breach or potential breach is not the same as stopping damage due to the breach from occurring.

It is accordingly recognized in the art that intrusion detection systems, while providing some beneficial services, are insufficient defense mechanisms against network attacks. Designers have further recognized the need to provide some measure of automatic response to suspected intrusions. Such response mechanisms are intended to extend the intrusion detection system functionality from its conventional passive detection mode to an advanced attack suppression mode. For example, two known active response mechanisms implemented by intrusion detection systems are: (a) session sniping (sending a TCP reset request to the TCP session end-points); and (b) firewall updating (sending a policy configuration request to a firewall or a router). These active mechanisms, however, are generally ineffective and easily bypassed by any attacker having a basic knowledge of how TCP/IP works. In fact, these response mechanisms can be turned against the victim network by launching denial of service response attacks against innocent servers whose addresses are spoofed in the attack, or by incorrectly denying access to legitimate machines.

The current state of the prior art with respect to providing such network protection utilizes a software-based intrusion detection system which is implemented on a general purpose processor. A difficulty with such an implementation is that the software cannot be executed quickly enough to make the packet inspections, comparisons and analyses that are required to adequately protect the network. Additionally, because the software-based solution is too slow, these implementations cannot act in a manner to effectively block dangerous traffic from entering the protected network.

It is accordingly recognized that conventional intrusion detection systems, even when equipped with response mechanisms, no longer present an adequate network defense strategy due to their passive listening configuration. It is further recognized that enhanced, active response, intrusion detection systems do not provide a sufficient measure of active defense capability. An improved performance active network defense system and method are thus needed to protect networks against increasingly sophisticated and more dangerous network attacks.

SUMMARY OF THE INVENTION

In accordance with one embodiment of the present invention, a network defense system includes a state manager functionality that is connected in-line with respect to a data flow of packets. The state manager functionality is operable to track sessions currently in existence on the data flow and save historical packet related data. The system further includes an algorithmic filter operable to perform a statistical analysis on the tracked sessions and historical packet related data to determine whether packets in the data flow across multiple sessions present a threat to a protected network.

The system further includes a packet handler that is also connected in-line with respect to the data flow of packets. The packet handler is operable responsive to the presence of a threat to block threatening packets.

The system still further includes a trigger filter that is also connected in-line with respect to the data flow of packets. The trigger filter is operable to filter packets in the data flow against criteria designed for detecting threatening packets in individual sessions. The trigger filter is further operable responsive to the algorithmic filter suspicion determination to filter the suspicious packets in the data flow against criteria designed for detecting threatening packets across multiple sessions.

The system still further includes a flow controller that is also connected in-line with respect to the data flow of packets. The flow controller is operable to regulate the rate of passage of packets along the data flow.

In the event packets are identified as suspicious, the system further includes a threat verifier. Suspicious packets are extracted from the data flow and then filtered by the threat verifier using more comprehensive filtering criteria than that used by the in-line trigger filter. The more comprehensive analysis is designed to resolve whether the suspicious extracted packets are in fact threatening.

Suspicious packets may also be analyzed by a risk assessor. The risk assessor is operable to examine the suspicious extracted packets and determine whether they present a certain risk to identifiable assets that are present within the network.

The present invention advantageously provides a significant improvement over the prior art software-based intrusion detection systems because of its ability to perform deep packet inspections for suspicious/dangerous content at line speeds. The performance of fast path pattern matching is key to accelerated packet handling while providing network protection against attacks. To support the necessary rates for pattern matching, and thus achieve deep packet inspection, the pattern matching operation is preferably performed using multiple parallel pattern matching operations. Implemented in this manner, the system becomes easily scalable to address future needs.

Additionally, it is recognized that some packets will require a more careful inspection. To that end, the present invention advantageously performs an initial screening to identify those packets which must be further analyzed. These packets are extracted from the data flow and then more carefully screened in a separate process flow.

In a preferred embodiment of the invention, the system advantageously utilizes a mixed hardware/software solution to provide the proper level of packet screening while maintaining packet throughput rates. In-line components are preferably implemented in hardware. For example, pattern matching operations are performed using hardware designs that operate much more quickly than prior art software-based intrusion detection solutions. Control and configuration can be handled in software to give the system a level of flexibility. Still further, out of line processing of packets that are extracted from the data flow is preferably performed in software in order to allow the system to more carefully consider any threat presented by those packets. This architecture further allows the system to be scalable as data rate increase.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The present invention provides an active network defense system that is operable to monitor and block traffic in an automated fashion. This active network defense system is preferably placed in-line (i.e., in the packet traffic data flow) as a part of the network infrastructure to inspect and possibly manipulate every passing packet. This network defense solution constitutes a dramatic technology shift away from the passive intrusion detection systems of the prior art.

Importantly, the active network defense system must be capable of performing reliably at line speeds. When it detects a malicious packet, action is immediately taken to drop that packet and thus prevent its entrance into the network where damage could be done. Thus, with the dropping of the packet, the attack is immediately blocked, with the added benefits that no damage needs to be repaired and no alarms need to be processed.

The active network defense system provides some further advantages. Beyond blocking, the active network defense system possesses the ability to modify packets. One packet modification concept of some importance is the notion of normalization. Normalization is the process of enforcing adherence to a particular implementation of a protocol or standard. For example, a popular intrusion detection system evasion technique exploits the variation in the ways target systems handle fragmentation. Some systems reassemble overlapping fragments with the first overlapping packet's data, others reassemble with the last packet's data. An intrusion detection system needs to guess at how the target may reassemble or consider all options. By failing to predict how the target will behave, attacks may either go undetected or false alarms be generated. In contrast, by sitting in-line and intercepting all packets, the active network defense system of the present invention can perform normalization by reassembling fragments using a set algorithm and forwarding reassembled packets. Normalizing the flow eliminates the need to guess at how a packet or flow will be handled on different target systems and thwarts popular detection evasion techniques.

The active network defense system further possesses the capability to actively manage packet flow (throughput). This concept of throttling flows allows the active network defense system to prioritize known "good" traffic while limiting or slowing the passage of suspicious traffic. In this context, it is recognized that many denial of service attacks produce traffic that is indistinguishable from legitimate traffic. By throttling traffic detected as having certain attributes, a denial of service attack can at least be thwarted from overwhelming a target resource (and it may further be possibly stopped). As an added benefit, with throttling controls available, mission critical traffic throughput can be boosted by assigning it a higher priority through the active network defense system and thus improving network productivity.

In order for the active network defense system to be successful, it should be capable of performing stateful inspections of the packet traffic at line speeds and with low latency. For example, WAN/LAN access speeds are in the multi-gigabit range, and thus the active network defense system should possess hardware capabilities in the gigabit rate with millisecond latencies typical of switches and routers. The goal here is the performance of deep pattern matching. The active network defense system should possess a reliability measure that avoids discarding useful traffic. Also, because the active network defense system is implemented as a part of the network infrastructure, it should be capable of delivering high availability.

With this background in mind, a more detailed examination of the active network defense system and method in accordance with the present invention is now presented.

Figure 1:
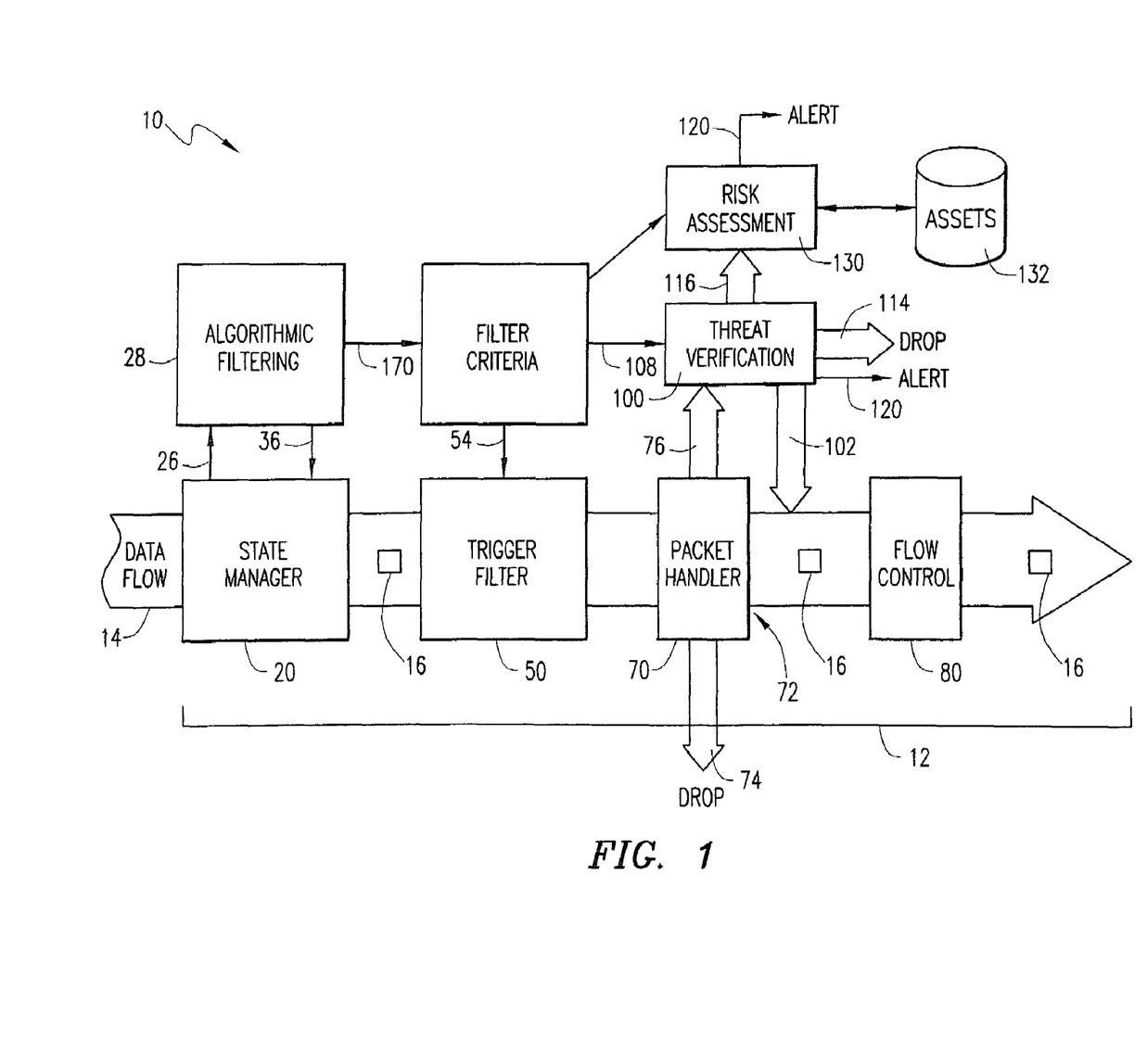
FIG. 1 is a block diagram of an active network defense system in accordance with the present invention.
Figure 2:
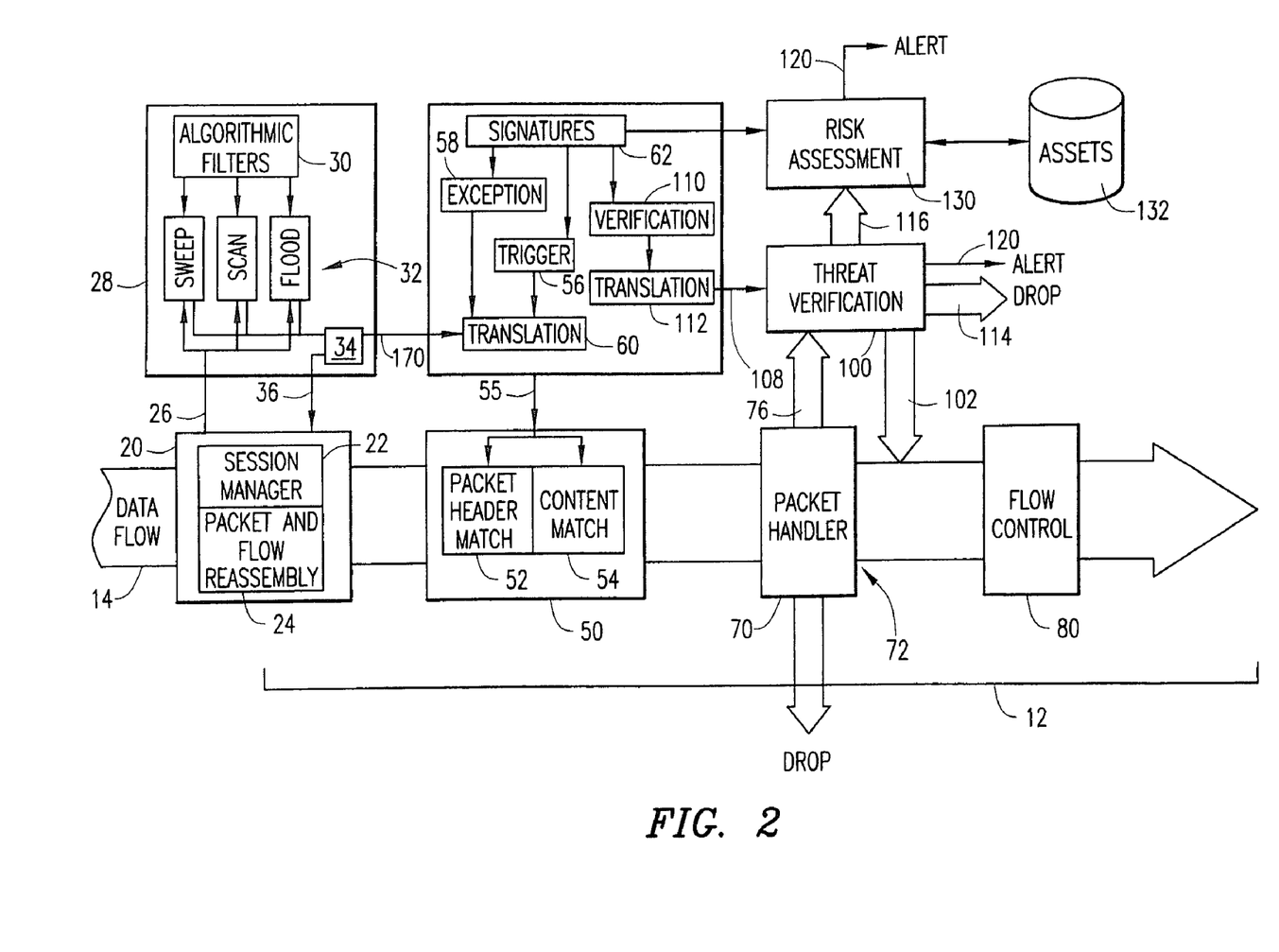
FIG. 2 is a more detailed block diagram of the system of FIG. 1.

Reference is now made to FIGS. 1 and 2 wherein there is shown a block diagram of an active network defense system 10 in accordance with the present invention. The system 10 is configured as a part of the network infrastructure 12 of an enterprise. This configuration advantageously allows the system 10 to be placed in-line with respect to the data flow 14 being monitored. Such an in-line placement facilitates inspection and possible manipulation of each and every packet 16 within the data flow 14. As such, it is imperative that the system operate at a rate close to, if not preferably exceeding, line speed for the data flow 14. Through in line processing, the system performs a deep packet inspection with respect to each passing packet.

A number of in-line functionalities are provided by the system 10. A first of those functionalities comprises a state manager functionality 20. The state manager 20 performs two key operations in connection with the active monitoring of the data flow 14. First, the state manager 20 implements a session management operation 22. This session management operation 22 monitors and manages the state of each session relating to packet traffic being carried over the data flow 14. More specifically, the session management operation 22 tracks, perhaps with a table or other mechanism, which sessions are currently in existence on the data flow 14 and saves historical packet related data for examination. For example, a connection table may be used to maintain data concerning the state of each connection (such as, TCP SYN, SYN ACK, and the like). Examples of the types of historical packet related data that may be retained include:

reassembly of fragmented packets;

reassembly of TCP session flows;

maintenance of negotiated ephemeral ports (for example, FTP establishes a dynamic port over which to exchange data);

connection establishment state (proper handshake between communicating hosts such as, for example, the well-defined exchange for TCP in establishing a connection); and protocol and application level state information (ensuring that applications or protocols are transitioning to well-defined states that do not violate the specifications of those applications or protocols or exploit known vulnerabilities in those applications or protocols.

Each packet 16 in the data flow 14 is examined in-line by the session management operation 22 for the purpose of ensuring that individual packets are associated with a recognized session. In the event a packet 16 is examined which is not associated with a session, that rogue packet 16 may be identified as suspicious or threatening and then blocked by the system 10. Additionally, record of the relationship between packets and sessions is kept so that the system 10, when it discovers a threatening or suspicious packet, can choose to similarly handle (by dropping or further examining) all packets within the session containing the detected packet. This concept is referred to a "session redirection."

Second, the state manager 20 implements a packet and flow reassembly operation 24. In connection with this operation, it is recognized that attacks on the network may be split over multiple packets. In this way, the attacker tries to hide the attack over several packets which individually appear to be benign. To guard against this, the packet and flow reassembly operation 24 monitors the data flow 14 with respect to established connections and examines plural packets, and their contents, over time (using the historical data referenced above) in order to try and detect the existence of an attack. In this way, the packet flow and reassembly operation tracks packets and their payloads, identifies relationships between packets, and reassembles the packet payloads together, with the reassembled packet data being analyzed for threat potential. In the event a collection of packets 16 for a common flow are examined and when reassembled are determined to present a threat, those packets (and related packets in the same flow or session) may be blocked by the system 10 and/or the flow/session associated with those threatening packets may be terminated by the system 10. Thus, this functionality allows for the tracking of pattern matching across packet boundaries.

The normalization process may implicate a number of different packet handling procedures which are designed to enforce conformance to certain standards. This is accomplished in connection with the present invention because the state manager "touches" each packet passing along the data flow. For example, normalization allows the system to define a certain reassembly policy with respect to the protected network. Recognizing the threats of fragmented packets, this policy may dictate that any packets which arrive out of order will be unconditionally blocked, thus forcing the sending entity to resend in proper order before the packets can be received by the protected network. Normalization also allows the system 10 to implement certain interpretation rules with respect to IP options. Additionally, normalization may require that all coded (for example, Hex or Unicode) packets be decoded first before being passed on to the protected network. These operations thus enforce adherence to certain rules or normalization constraints and better protect the network from attack.

The state manager is preferably implemented as an application customized piece of hardware in order to ensure its ability to perform the necessary tasks at maximum possible speed (preferably exceeding line speed for the data flow).

To assist in the operation of the state manager 20, data is collected by the state manager 20 concerning the nature of the passing packet traffic. For example, this data may be compiled or collected in the connection table referenced above. This data includes information about the packet traffic in individual sessions as well as information about the packet traffic across multiple different sessions.

Two implementations of the data relationship between the state manager and the algorithmic filtering operation are possible. In a first implementation, the data is merely collected at the state manager and reported to the algorithmic filtering operation. In a second implementation, the data is collected and summarized at the state manager, with the summary then reported to the algorithmic filtering operation. The second implementation is preferred because it saves the filter from having to perform the summarization before performing the filtering operating, and thus a processing speed increase is obtained. However, this second implementation requires a much more complex hardware state manager implementation which adds to the design cost.

The collected data is reported 26 to an algorithmic filtering operation 28. The algorithmic filtering operation 28 performs a statistical analysis on the reported data to determine whether the data is indicative of a potential problem (i.e., it is suspicious) or threat. The statistic analysis performed by the algorithmic filtering operation 28 is designed to catch instances, as revealed by the reported data concerning the nature of the packet traffic in the data flow across a plurality of different sessions, of address sweep attacks, port scan attacks and denial of service attacks. To accomplish this goal, a set of algorithmic filters 30 are designed or tailored for the identification, detection and suppression of recognized network threats which occur across multiple sessions. These algorithmic filters 30 are then supplied to a set of detection engines 32, with one engine being implemented for each one of a plurality of recognized session attack scenarios (like, address sweeps, port scans and denials of service). Each detection engine 32 also receives the reported 26 data (or a subset thereof) collected by the state manager 20 concerning the packet traffic in individual sessions as well as information about the packet traffic across multiple different sessions. By evaluating the reported 26 data in a statistical manner against the algorithmic filters 30, each detection engine 32 can come to a conclusion as to whether the network is currently under a multi-session attack. A management function 34 within the algorithmic filtering operation 28 then acts on the conclusions of the detection engines 32 by providing appropriate feedback 36 to the state manager 20. In situations where a threat from the multiple session packet traffic in the data flow is detected, the dangerous packets may be blocked by the system 10 and/or the sessions associated with those packets may be terminated by the system 10.

The algorithmic filtering operation is preferably implemented as a customizable software application (that interfaces with the hardware state manager) in order to ensure its continued flexibility and ability to be tailored or tuned to security risks. In this way, the threat detection capability can also be scaled as needed. Additionally, by limiting the functions performed by the algorithmic filtering operation, and pushing as much functionality (beyond the threat detection operation) into the state manager where it can be run efficiently and quickly in hardware, overall packet handling speeds can remain high and allow the operation to be run at line speed.

A second of the in-line functionalities provided by the system 10 comprises a trigger filter functionality 50 which implements a form of stateful pattern matching that facilitates deep packet inspection. The trigger filter 50 performs two filtering operations in connection with the active monitoring of the data flow 14. First, a packet header matching operation 52 looks into each packet and determines whether the header field values therein give rise to a suspicion of dangerous traffic. This operation involves checking the fixed header fields (such as, for example, destination and source IP address, destination and source ports, and the like) for the presence of information indicative of an attack. For example, packets may be classified based on their header information. This classification can then be used alone to filter, or it can be used to provide context when performing other filtering operations as discussed next. Second, a packet content matching operation 54 looks into each packet and determines whether the content (character) strings and/or regular expression values therein give rise to a suspicion of dangerous traffic. This operation involves matching the packet payload elements to strings and expressions identified as being associated with an attack. It will be recognized that the packet header matching operation 52 and the packet content matching operation 54 may advantageously operate in conjunction with each other to detect suspicious packet traffic based on a detected combination of header field values and content strings/regular expression values. In situations where a threat is detected, the dangerous packets may be blocked by the system 10 and/or the sessions associated with those packets may be terminated by the system 10.

Although the description above is focused on a trigger operation that looks for dangerous or suspicious traffic (and then blocks that traffic), it is possible that in some situations the triggers could be implemented, and the filters designed, to look for the qualities and characteristics of "good" traffic. In this case, it would be all packets that fail to be identified as meeting the "good" criteria which are blocked by the system 10, with the identified good traffic being allowed to pass.

The trigger filter functionality is preferably implemented as an application customized piece of hardware in order to ensure its ability to perform the necessary tasks at maximum possible speed (preferably exceeding line speed for the data flow). More specifically, the process for fast path pattern matching is performed through the use of plural, hardware implemented, pattern matching components in a parallel processing architecture. This configuration allows the system to operate at line speeds and further provides for future scalability.

To assist in the operation of the trigger filter functionality 50, filtering criteria (or rules) 54 are supplied to both the packet header matching operation 52 and the packet content matching operation 54. These rules 54 include both detection triggers 56 as well as detection exceptions 58. A detection trigger 56 is an identification of one or more header field values, content strings and/or regular expression values, singly or in combination with each other, whose matched presence within the payload elements of a packet of a single session is indicative of a threat to the network. A detection exception 58 is an identification of one or more header field values, content strings and/or regular expression values, singly or in combination with each other, whose presence within the payload elements of a packet of a single session, while possibly being of concern, should nonetheless not be considered as being indicative of a threat to the network. A translation functionality 60 is provided to translate the detection triggers 56 and detection exceptions 58 into the filtering criteria (or rules) 54 which are supplied to, and acted upon by, the packet header matching operation 52 and the packet content matching operation 54 of the trigger filter functionality 50. This translation may, for example, comprise a conversion of the data into lower level machine code for implementation by the packet header matching operation 52 and the packet content matching operation 54.

The detection triggers 56 and detection exceptions 58 are derived from a set of detection signatures 62 that are specifically designed or tailored for the identification, detection and suppression of recognized single session type network threats. For example, the detection signatures 62 (comprising, for example, security rules, policies and algorithms) may be designed to mitigate or avert network damage from detected vulnerabilities. These signatures 62 may be obtained from any one of a number of well known sources, including, for example, machine (host) manufacturers, service suppliers, the Internet, and the like. Additionally, the signatures 62 may be created by an administrator of the protected network. Still further, the signatures 62 may be supplied by a entity in the business of signature creation, where that entity operates to collect threat information (for example, worm, virus, trojan, denial of service, Access, Failure, Reconnaissance, other suspicious traffic, and the like) from around the world, analyze that information and design detection signatures 62 that can be used by others to mitigate or avert network damage from the collected threats.

The detection signatures 62, generally speaking, include an object defining criteria (for example, TCP, HTTP and URI related criteria) that must be met by one or more of the extracted packet features in order to detect a potential threat to the network posed by the inspected traffic. As an example, each detection signature may include the following objects:

meta data: describing the name, identification, category and class of the signature;

action set: a definition of the action or actions (permit, deny, log, block, terminate, and the like) to be performed by the system 10 if the threat is detected;

query: a definition (or identification) of the particular network component(s) (machine set) that is threatened and to which the signature applies; and signature definition: the set of criteria that must be matched in order for the threat to be identified along with any associated parameters that must be considered.

The operations relating to filter criteria management as discussed above are preferably implemented as a customizable software application (that interfaces with the hardware trigger filter functionality) in order to ensure its continued flexibility and ability to be tailored or tuned to security risks. In this way, the threat detection capabilities of the system can be scaled as needed.

Preferably, the filtering comparison operation performed by the trigger filter functionality 50 is implemented on either or both the packet level and/or the session level. On a packet level, the inspection and filtering operation considers each packet individually when applying the rules of the detection signatures. On a session level, the inspection and filtering operation considers a plurality of related packets together when applying the rules of the detection signatures. To assist in a session level comparison, the system 10 may rely on the state information relating to the stored historical packet related data. For a session level comparison, the comparison and filtering not only considers the extracted packet features (header and payload) for the current packet under examination, but also historical packet related data. In the event of a match between the signature 62 criteria and the combined extracted packet features and historical packet related data, a potential threat to the network 14 is detected.

A third of the in-line functionalities provided by the system 10 comprises a packet handler functionality 70. The packet handler functionality 70 operates, responsive to the evaluations and conclusions reached by the state manager functionality 20 and the trigger filter functionality 50, as a gatekeeper and determines how the packets and/or sessions are to be handled. More specifically, the packet handler functionality compiles the analysis and examination results of the state manager 20 and the trigger filter functionality 50 to determine whether a certain packet is of interest and then acts appropriately on that packet. Three handling options are available for packets determined to be of interest. First, to the extent that neither the state manager functionality 20 nor the trigger filter functionality 50 detect any threat, danger or suspicion with respect to a certain packet or session, that packet traffic is allowed to pass 72 and continue along the data flow 14. Second, to the extent either the state manager functionality 20 or the trigger filter functionality 50 detect a clear threat or danger with respect to a certain packet or session, that packet traffic is blocked and dropped 74 from the data flow 14. Third, to the extent either the state manager functionality 20 or the trigger filter functionality 50 detect a suspicion of a threat or danger with respect to a certain packet or session, that packet traffic is extracted 76 from the data flow 14 for further, more careful, examination as will be discussed in more detail herein.

This packet handler functionality is preferably implemented in hardware in order to preserve its ability to act quickly in making the sorting decisions with respect to the passing packets in the data flow.

A fourth of the in-line functionalities provided by the system 10 comprises a flow control functionality 80. The flow control functionality 80 operates to shape the traffic flow output along the data path 14 based on certain programmable or configurable priorities. Traffic shaping is primarily accomplished by throttling up (or, conversely, throttling down) the rate at which certain packet traffic is allowed to pass along the data path 14. For example, known and confirmed benign traffic may be prioritized for transmission along the data path 14. Similarly, packet traffic relating to known mission critical applications may be given priority over other less critical traffic. More generally, traffic of a certain type can be throttled such that it does not exceed a certain threshold volume. This serves to prevent the over-running of downstream resources or interfering with higher priority traffic.

This flow control functionality is preferably implemented in hardware in order to preserve its ability to act quickly in making the handling decisions with respect to the passing packets in the data flow.

With respect to the packet traffic identified as suspicious and then extracted 76 from the data flow 14 by the packet handler functionality 70, a more careful and thorough examination is made of that traffic before making a final handling decision. This further examination is carried out using an out-of-line threat verification functionality 100. By "out-of-line" it is meant that the packet traffic is being handled away from the main data flow 14. The threat verification functionality 100 operates in an analogous manner to the in-line trigger filter functionality 50 previously discussed in detail. A primary operational difference, however, exists in connection with the level of detailed examination that is performed. Because the trigger filter functionality 50 must operate in-line, the filtering criteria (or rules) 54 must be designed for implementation at essentially line speed (preferably using a customized hardware solution as discussed above). This design criteria essentially forces the trigger filter functionality 50 to focus its detection efforts on a less thorough examination and evaluation that is designed to quickly identify suspicious and clearly dangerous or threatening packet traffic. The nature of this examination will inevitably identify as suspicious a certain amount of what could, with further more detailed analysis, be determined to be benign traffic. The goal of the out-of-line threat verification functionality 100, however, is to more thoroughly evaluate this suspicious traffic in order to separate out and return 102 the benign portion of the suspicious traffic to the data flow 14. To that end, it can advantageously be implemented as a customizable software application in order to ensure its continued flexibility and ability to be tailored or tuned to a more thorough and careful evaluation of security risks.

Due in part to its software-based implementation, the threat verification functionality 100 implements a slightly different evaluation process than the trigger filter functionality 50. More specifically, the threat verification functionality 100 performs a detailed threat analysis using protocol decoders and regular expression matching. This takes more time and resources than the trigger filtering evaluation, but it results in a much more accurate threat determination. To implement this operation, the filtering criteria (or rules) 108 that are supplied to the threat verification functionality 100 are far more comprehensive and discerning than the rules 54 supplied to the in-line trigger filter functionality 50. Because the evaluation of the extracted 76 suspicious traffic is performed out-of-line, and the volume of traffic being examined is considerably reduced, additional time is available in the threat verification functionality 100 to more carefully consider whether each packet truly presents a threat or danger to the network. Detection verifications 110 relating to the protocols and regular expression of interest are provided. A translation functionality 112 then translates the detection verifications 110 into the filtering criteria (or rules) 108 which are supplied to, and acted upon by, the threat verification functionality 100. The detection verifications 110 are derived from the same set of detection signatures 62 as described above which were specifically designed or tailored for the identification, detection and suppression of recognized single session type network threats.

The threat verification functionality 100 responds to the more careful analysis of the suspicious traffic with a selection of one of three handling options. First, to the extent that it confirms the packet traffic as benign, it is returned 102 to the data flow 14. Second, to the extent that it confirms a clear threat or danger, the packet traffic is blocked and dropped 114. Third, to the extent a clear determination (benign or threat) cannot be made, the packet traffic is returned 102 to the data flow, but a copy of that traffic is passed on 116 for still further consideration and handling to determine if an alarm needs to be generated.

A better understanding of the difference between the analysis performed by the trigger filter functionality 50 and the analysis performed by the threat verification functionality 100 may be obtained by consideration of the following. The filtering criteria utilized by the trigger filter functionality 50 are implemented as a hardware-based triggering mechanism to allow for relatively high speed examination of the received packet traffic where limited processing capability filtering is used with a design to catch substantially all suspicious traffic, understanding that the filter will inevitably erroneously additionally capture some benign traffic (i.e., accuracy is relatively low and there will be a number of false positives) along with the dangerous traffic. As an example, this level of screening implicates header field compares and trigger content searches (i.e., short string compares) that can be performed at higher speed using less complex algorithms and processes with the screened output being more susceptible to including errors. The filtering criteria utilized by the threat verification functionality 100, on the other hand, are implemented as a software-based confirmation mechanism to allow for lower speed examination of the suspicious portion of the packet traffic where more complex processing capability filtering is used with a design to more carefully examine the suspicious traffic and identify the most likely threatening or dangerous traffic, understanding again that the threat verification functionality 100 may erroneously capture some benign traffic (i.e., accuracy is relatively high, although there could be a minimal number of false positives), but that the likelihood of this occurring will be significantly smaller than that experienced with the trigger filter functionality 50. As an example, this second level of screening implicates protocol decoders and regular expression matching (i.e., long string compares) at lower speed using more complex algorithms and processes with the screened output being less susceptible to including errors.

With respect to the copy of the (still suspicious) packet traffic that is passed on 116 by the threat verification functionality 100, a number of possible actions can be taken. For example, an alert 120 could be generated and a copy of the suspicious packet traffic delivered to a network administrator for further examination. Alternatively, the suspicious packet traffic can be evaluated by an out-of-line risk assessment functionality 130. The risk assessment functionality 130 operates to evaluate whether the suspicious packet traffic presents an identifiable, concrete risk to the machines and devices which are present within the network. To assist in this determination, an asset database 132 is maintained by the system 10 that contains information on each of the machines and devices present within the protected network as well as their interconnection and operational relationship to each other. For example, the asset database 132 preferably contains enterprise (i.e., the protected network) specific data identifying machines (hosts) in the network, services provided by the hosts, and potential computer system and network device vulnerabilities associated with those machines and services in the context of the network configuration. This data may be collected in any one of a number of well known ways, including, for example, the use of a separate, perhaps prior art, vulnerability assessment scanner device that operates to assess the protected network in a conventional manner. The risk assessment functionality then evaluates the detection signatures (more particularly, the threatened network component(s) (machine set) information of the signature) which have triggered the suspicion, in the context of the assets within the network, to determine what types of network assets are threatened by the packet traffic detected as being suspicious through the application of the detection signatures. In the event, as determined by the information contained in the database 132, the protected network does not possess any of the threatened machines or devices, then the suspicious traffic is of little or no concern to the network and can be ignored. To the extent, however, that the protected network contains assets which are possibly threatened by the suspicious traffic, then the traffic must thereafter be either blocked and dropped or alerted against to notify a network/security administrator of a potential threat in order to reduce or eliminate the risk of damage. In this situation, an alert 120 could be generated and the suspicious packet traffic delivered to a network administrator for further examination.

Reference is now once again made to the algorithmic filtering operation 28. More specifically, it will be remembered that the detection engines 32 evaluate the reported 26 data in a statistical manner against the algorithmic filters 30 and come to a conclusion as to whether the network is currently under a multi-session attack. It is possible that this evaluation will fail to conclusively establish either the existence or non-existence of an attack. In such a situation, a suspicion of an attack arises. To address this suspicion, the detection engines are configured to generate a suspicion alert 170 which is forwarded to the translation functionality 60. Responsive thereto, the translation functionality 60 may alter or adjust its translation operation to tailor the detection trigger 56 and detection exception 58 translations into the filtering criteria (or rules) 54 such that the packet header matching operation 52 and/or the packet content matching operation 54 of the trigger filter functionality 50 become more sensitive to the possible existence of a multi-session attack. In this way, some control is exercised over the packet header matching operation 52 and/or the packet content matching operation 54 to try and find the multi-session attack whose existence is suspected based on the statistical analysis performed by the algorithmic filtering operation 28.

The system 10 is preferably configured as a network element in the protected network. The system 10 thus would include a number of external physical interfaces that allow for connection to the outside world (i.e., the untrusted world outside of the protected network). As an example, the untrusted world may comprise any one or more of the following: a wide area network (WAN); a virtual private network (VPN) server; local area network (LAN) clients; a wireless or remote access server; and, an untrusted network (such as the Internet). A number of internal physical interfaces would also be included with the system 10 to allow for connection to the elements of the protected (trusted) network. As an example, the elements of the protected network may include: a router; special server types (for example, HTTP, SMTP, FTP, DNA, and the like); an intranet; personal computers; and, network zones. It will be recognized that the internal and external physical interfaces may be connected as desired in configuring the interconnection of the trusted network and the untrusted network.

The system 10 is preferably implemented on an appropriate physical platform which supports its operation. The platform comprises the underlying hardware, operation system and core infrastructure facilities necessary to allow the system to provide a suitable execution environment for security application. This execution environment includes operations, administration, maintenance and provisioning facilities, an embedded operating system supporting the execution of security applications, and hardware (such as chassis, power supply, expansion capabilities, circuit card support, and the like). Although preferred implementations have been discussed above, the functionality of the system 10 may be implemented on the platform in hardware alone, software alone or a combination of both hardware and software.

With respect to the comparison and filtering operations performed by the system at either the trigger filter functionality 50 or the threat verification functionality 100, a number of processing functions may be considered and evaluated for purposes of use in, or in connection with, the filtering criteria. At OSI layer 1, the physical hardware interface for packet communication may be considered. At OSI layer 2, the following data link related coding, addressing and transmitting information may be considered: ethernet source/destination address, VLAN PRI/CFI, VLAN identifier and ethernet type, and MPLS labels. At OSI layer 3, the following network related transport route, message handling and transfer information may be considered: IP fields (for example, source/destination address, payload length, fragbits, header length, ID field, offset field, options, protocol field, type of service field, time-to-live field and version field), and ARP fields (sender and target MAC or protocol address, protocol or hardware type or size). Additionally, at OSI layer 4, the following transport related delivery service and quality information may be considered: TCP fields (source/destination port, data length, header length, acknowledgment number, flags, sequence number, urgent pointer, window and checksum), ICMP (type, code, sequence, ID, data length, checksum, icmp.code), and UDP (source/destination port). The processing functions may additionally evaluate protocol decode information as follows: HTTP (all header fields including request line, method, URI, protocol, host, content length, body), DNS, SMTP, SNMP, SMP, FTP, and the like. Still further, the processing functions may evaluate: fixed string-fixed offset, fixed string-variable offset, regular expression-fixed offset, regular expression-variable offset, collection of events, sequences of events, fragmentation, connection state, flow reassembly, normalization techniques (detect and eliminate overlapping fragments, evasion techniques), and hex and unicode decoding.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A network defense system, comprising:

a state manager functionality connected in-line with respect to a data flow of packets, the state manager functionality operating to track a plurality of sessions currently in existence on the data flow and save historical packet related data for each of those sessions; and an algorithmic filter operating to perform a statistical analysis on the tracked plurality of sessions and saved historical packet related data wherein the statistical analysis evaluates information relating to packets within a first session and information relating to packets within a second session in making a determination that the packets in the data flow from both the first and second sessions present a multi-session attack threat to a protected network.

2. The network defense system of claim 1 further including a packet handler also connected in-line with respect to the data flow of packets and operating responsive to the presence of the multi-session attack threat to block threatening packets.

3. The network defense system of claim 2 wherein the packet handler further operates responsive to the presence of the multi-session attack threat to terminate threatening sessions.

4. The network defense system of claim 1 wherein the multi-session attack threat to the protected network comprises a threat taken from the group consisting of: address sweep attacks, port scan attacks and denial of service attacks.

5. The network defense system of claim 1 wherein the algorithmic filter performs a statistical analysis on the tracked sessions and saved historical packet related data wherein the statistical analysis evaluates information relating to packets within the first session and information relating to packets within the second session in making a determination as to whether packets in the data flow from both the first and second sessions are suspicious of a multi-session attack threat to the protected network.

6. The network defense system of claim 5 further including:

a trigger filter also connected in-line with respect to the data flow of packets and operating responsive to the algorithmic filter suspicion determination to filter the suspicious packets in the data flow against criteria designed for detecting threatening packets across multiple sessions; and a packet handler also connected in-line with respect to the data flow of packets and operating responsive to the detected threat to block the threatening packets.

7. The network defense system of claim 6 wherein the trigger filter further filters packets in the data flow against criteria designed for detecting threatening packets in individual sessions.

8. The network defense system of claim 6 wherein the packet handler is implemented in hardware.

9. The network defense system of claim 7 wherein the trigger filter still further determines whether packets in the data flow in individual sessions are suspicious, the packet handler further extracting the suspicious packets from the data flow for further examination.

10. The network defense system of claim 9 further including:

a threat verifier that receives the extracted packets from the packet handler and implements a filtering operation thereon with criteria that is more comprehensive than the criteria used by the in-line trigger filter for the purpose of resolving whether the suspicious extracted packets are threatening.

11. The network defense system of claim 10 wherein the threat verifier returns suspicious extracted packets back to the data flow after the trigger filter in the event the suspicious packets are determined not to be threatening.

12. The network defense system of claim 10 further including:
a risk assessor operating to examine the suspicious extracted packets in terms of which types of network assets are threatened and determine whether the packets present a certain risk to assets that are identified to be present within the network.

13. The network defense system of claim 12 wherein the determination is made by an asset database maintained by the system.

14. The network defense system of claim 13 wherein said asset database contains information on each of the machines and devices present within the network defense system as well as their interconnection and operational relationship to each other.

15. The network defense system of claim 10 wherein the threat verifier uses protocol decoders and regular expression matching for determining whether the suspicious extracted packets are threatening.

16. The network defense system of claim 15 wherein the threat verifier is implemented in software.

17. The network defense system of claim 1 further including a flow controller also connected in-line with respect to the data flow of packets and operating to regulate a rate of the passage of packets along the data flow and through the network defense system to the protected network.

18. The network defense system of claim 17 wherein the flow controller is further operable to regulate the rate of passage of packets along the data flow based on certain programmable or configurable priorities.

19. The network defense system of claim 18 wherein the flow controller is implemented in hardware.

20. The network defense system of claim 1 wherein:
the state manager functionality is implemented in hardware; and
the algorithmic filter is implemented in software.

21. The network defense system of claim 1 further comprising means for performing stateful inspections of the data flow of packets at line speeds.

22. The network defense system of claim 1 wherein the state manager operates to ensure whether individual packets in the data flow are associated with a recognized session.

23. The network defense system of claim 1 wherein the historical packet related data includes a nature of passing packet traffic.

24. The network defense system of claim 23 wherein the historical packet related data further includes information about the packet traffic in individual sessions.

25. The network defense system of claim 24 wherein the historical packet related data further includes information about the packet traffic across multiple different sessions.

26. A method for defending a protected network, comprising the steps of:
tracking a plurality of sessions currently in existence on a data flow of packets;
collecting historical packet related data with respect to each of those sessions; and
algorithmically filtering the tracked plurality of sessions and collected historical packet related data to determine based on a statistical analysis which evaluates information relating to packets within a first session and information relating to packets within a second session that the packets in the data flow from both the first and second sessions present a multi-session attack threat to the network.

27. The method of claim 26 further including handling packets in the data flow of packets by blocking threatening packets in response to the presence of a determined multi-session attack threat.

28. The method of claim 27 wherein the step of handling further comprises the step of terminating threatening sessions in response to the presence of a determined multi-session attack threat.

29. The method of claim 26 wherein the multi-session attack threat to the protected network comprises a threat taken from the group consisting of: address sweep attacks, port scan attacks and denial of service attacks.

30. The method of claim 26 further including determining from the statistical analysis which evaluates information relating to packets within the first session and information relating to packets within the second session whether packets in the data flow from both the first and second sessions present a suspicion of a multi-session attack threat to the network.

31. The method of claim 30 further including:
filtering packets in the data flow of packets in operable response to the suspicion of a threat against criteria designed for detecting threatening packets across multiple sessions; and
handling packets in the data flow of packets by blocking threatening packets in response to the presence of a detected threat.

32. The method of claim 31 wherein filtering packets further includes filtering packets in the data flow against criteria designed for detecting threatening packets in individual sessions.

33. The method of claim 32 wherein filtering packets still further includes determining whether packets in the data flow in individual sessions are suspicious, and wherein handling further includes extracting the suspicious packets from the data flow for further examination.

34. The method of claim 33 further including:
verifying the threat with respect to the extracted packets by implementing a filtering operation thereon using criteria that is more comprehensive than the criteria used in filtering packets to identify suspicious packets, this verifying being made for the purpose of resolving whether the suspicious extracted packets are threatening.

35. The method of claim 34 wherein verifying the threat further includes returning suspicious extracted packets back to the data flow in the event the suspicious packets are determined not to be threatening.

36. The method of claim 34 further including:
assessing risk with respect to the suspicious extracted packets in terms of which types of network assets are threatened by determining whether the packets present a certain risk to assets that are identified to be present within the network.

37. The method of claim 36 wherein determining is made by an asset database.

38. The method of claim 37 wherein the asset database contains information on each of the machines and devices present within the network as well as their interconnections and operational relationship to each other.

39. The method of claim 34 wherein verifying further includes using protocol decoders and regular expression matching for determining whether the suspicious extracted packets are threatening.

40. The method of claim 26 further including controlling flow by regulating a rate of the passage of packets along the data flow and through to the protected network.

41. The method of claim 40 wherein controlling flow further includes regulating the passage of packets along the data flow based on certain programmable or configurable priorities.

42. The method of claim 26 further including ensuring whether individual packets in the data flow are associated with a recognized session.

43. The method of claim 26 wherein collecting historical packet related data includes collecting a nature of passing packet traffic.

44. The method of claim 43 wherein collecting historical packet related data further includes collecting information about the packet traffic in individual sessions.

45. The method of claim 44 wherein collecting historical packet related data further includes collecting information about the packet traffic across multiple different sessions.

46. A system for defending a network, comprising:
a state manager functionality connected in-line with respect to a data flow of packets, the state manager functionality operating to track information concerning a plurality of sessions currently in existence on the data flow;
an algorithmic filter operating to perform a statistical analysis on the information for plural sessions to determine whether packets in the data flow of a first session and packets in the data flow of a second session in combination present a multi-session attack threat to the network;
a trigger filter also connected in-line with respect to the data flow of packets and operating to filter packets in the data flow against criteria designed for detecting threatening packets in individual sessions; and
a packet handler also connected in-line with respect to the data flow of packets and operating responsive to algorithmic and trigger filter detected threats to protect the network from the threatening packets.

47. The system of claim 46 further including a flow controller also connected in-line with respect to the data flow of packets and operating to regulate a rate of the passage of packets along the data flow and into the protected network.

48. The system of claim 46 wherein the algorithmic filter determines from the statistical analysis whether packets in the data flow from the first and second sessions in combination present a suspicion of a multi-session attack threat to the network, and wherein the trigger filter operates responsive to the suspicion determination to filter suspicious packets in the data flow against criteria designed for detecting threatening packets across multiple sessions.

49. The system of claim 46 wherein the packet handler operates responsive to the presence of a threat to terminate threatening sessions.

50. The system of claim 46 wherein the multi-session attack threat to the protected network comprises a threat taken from the group consisting of: address sweep attacks, port scan attacks and denial of service attacks.

51. The system of claim 46 wherein the trigger filter operates to extract packets from the data flow in the event the trigger filter determines them to be suspicious.

52. The system of claim 51 further including:
a threat verifier that receives the extracted packets and implements a filtering operation thereon that is more comprehensive than that performed by the in-line trigger filter for the purpose of resolving whether the suspicious extracted packets are threatening.

53. The system of claim 52 wherein the threat verifier returns suspicious extracted packets to the data flow in the event they are determined not to be threatening.

54. The system of claim 53 further including:
a risk assessor operating to examine the suspicious extracted packets and determine whether they present a certain risk to identifiable assets that are present within the network.

55. The system of claim 46 wherein the information analyzed by the algorithmic filter comprises session tracking data concerning the association of packets to established certain sessions.

56. The system of claim 46 wherein the information analyzed by the algorithmic filter comprises historical packet related data across multiple sessions.

57. The system of claim 46 wherein the filtering criteria comprise header and content matching criteria.

58. The system of claim 46 wherein the filtering criteria comprise multi-packet content matching criteria.

59. The system of claim 46 wherein the algorithmic filter implements statistical threshold filtering.

* * * * *